US010712473B2

(12) United States Patent
Girier et al.

(10) Patent No.: US 10,712,473 B2
(45) Date of Patent: Jul. 14, 2020

(54) WEATHER DATA PROCESSING APPARATUS AND METHOD USING WEATHER RADAR

(71) Applicant: KABUSHIKI KAISHA TOSHIBA, Minato-ku (JP)

(72) Inventors: Armand Simon Alymamy Girier, Tokyo (JP); Yeonsoo Yang, Machida (JP); Takahiro Watanabe, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 388 days.

(21) Appl. No.: 15/636,706

(22) Filed: Jun. 29, 2017

(65) Prior Publication Data

US 2018/0074224 A1    Mar. 15, 2018

(30) Foreign Application Priority Data

Sep. 15, 2016   (JP) .................. 2016-180873

(51) Int. Cl.
*G01W 1/00*    (2006.01)
*G06F 16/00*   (2019.01)
(Continued)

(52) U.S. Cl.
CPC .............. *G01W 1/10* (2013.01); *G01S 7/20* (2013.01); *G01S 13/95* (2013.01); *G01S 13/951* (2013.01);
(Continued)

(58) Field of Classification Search
CPC .......... G01W 1/10; G06F 17/30; G01S 13/95; G01S 13/951; G01S 7/20; G01K 2203/00
See application file for complete search history.

(56) References Cited

U.S. PATENT DOCUMENTS

| 7,965,291 | B1 | 6/2011 | Uralsky |
| 2008/0044104 | A1 | 2/2008 | Gering |

(Continued)

FOREIGN PATENT DOCUMENTS

| CN | 104931970 A | 9/2015 |
| JP | 2006-197237 A | 7/2006 |

(Continued)

OTHER PUBLICATIONS

Kodransky, Mass of a Raindrop, 1999.*

(Continued)

*Primary Examiner* — Gregory J Toatley, Jr.
*Assistant Examiner* — Lynda Dinh
(74) *Attorney, Agent, or Firm* — Oblon, McClelland, Maier & Neustadt, L.L.P.

(57) ABSTRACT

According to one embodiment, a weather data processing apparatus includes a storage configured to store weather data observed by a weather radar, and a processor. The processor is configured to acquire three-dimensional data of a cumulonimbus from the weather data; to detect a core of the cumulonimbus by using a principal component analysis process of the three-dimensional data; to calculate core detection data for displaying the core; and to execute a display process for effecting three-dimensional display of the cumulonimbus, and display of the core, based on the three-dimensional data of the cumulonimbus and the core detection data.

3 Claims, 12 Drawing Sheets

(51) Int. Cl.
*G01S 7/20* (2006.01)
*G01S 13/95* (2006.01)
*G01W 1/10* (2006.01)

(52) U.S. Cl.
CPC ......... *G06F 16/00* (2019.01); *G01K 2203/00* (2013.01); *Y02A 90/18* (2018.01)

(56) References Cited

U.S. PATENT DOCUMENTS

| | | | | |
|---|---|---|---|---|
| 2014/0253370 | A1* | 9/2014 | Mizutani | G01S 13/95 342/26 R |
| 2016/0154101 | A1 | 6/2016 | Kim et al. | |
| 2017/0272148 | A1* | 9/2017 | Wang | H04B 7/18506 |
| 2018/0038941 | A1* | 2/2018 | Wang | G01S 7/003 |

FOREIGN PATENT DOCUMENTS

| | | |
|---|---|---|
| JP | 2008-43759 A | 2/2008 |
| JP | 2011-186523 A | 9/2011 |
| JP | 2014-48131 | 3/2014 |
| JP | 2014-48273 | 3/2014 |
| JP | 2015-21801 | 2/2015 |
| WO | WO 00/70799 A1 | 11/2000 |

OTHER PUBLICATIONS

Sanchez et al, Planar 3D Modeling of Building Interiors From Point Cloud Data, 2012.*

Michael Dixon, et al., "TITAN: Thunderstorm Identification, Tracking, Analysis and Nowcasting—A Radar-Based Methodology" Journal of Atmospheric and Oceanic Technology, vol. 10, No. 6, XP007918399, Dec. 1993, pp. 785-797.

D. S. Zrnic, et al., "Agile-Beam Phased Array Radar for Weather Observations" American Meteorological Society, Nov. 2007, pp. 1753-1766.

Fusako Isoda, et al., "Three-dimensional observations of heavy rainfall using a phased-array weather radar", Visualization Information, vol. 34, No. 135, Oct. 2014, pp. 148-153 (with English language translation).

"Launched "DioVISTA/Storm" software that displays rain clouds overlaid on a map and displays them three-dimensionally", Hitachi Power Solutions Corporation, Aug. 5, 2014, (with English language translation).

* cited by examiner

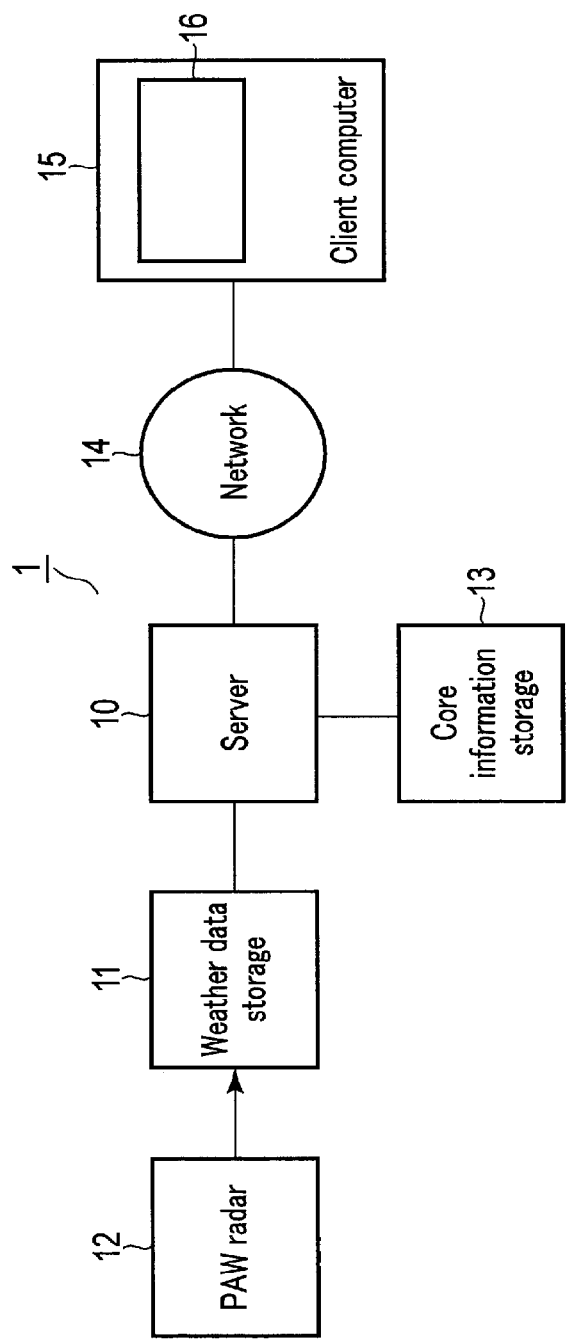
F I G. 1

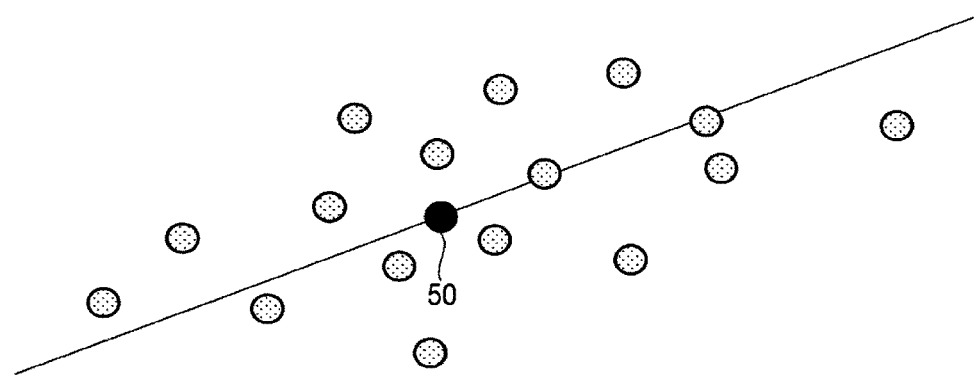
F I G. 11
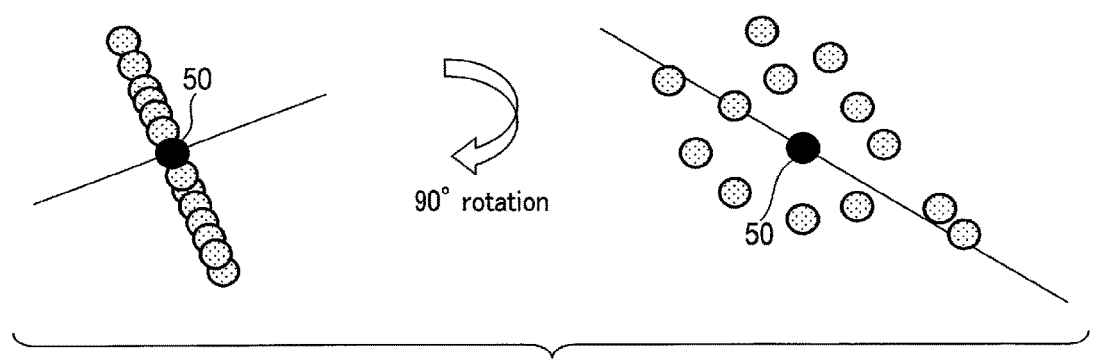
F I G. 12

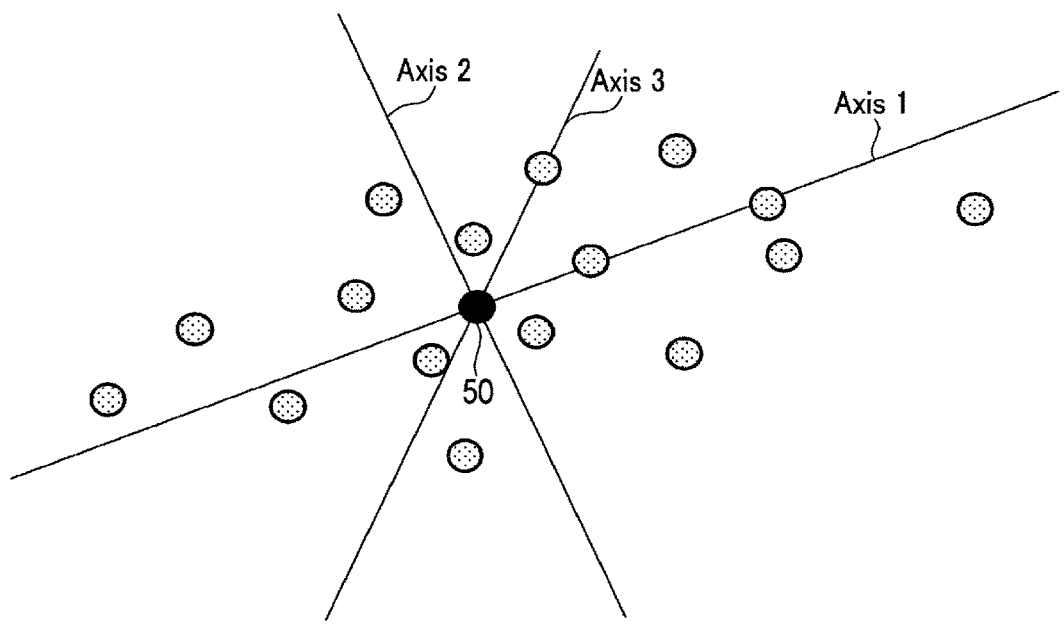
F I G. 13
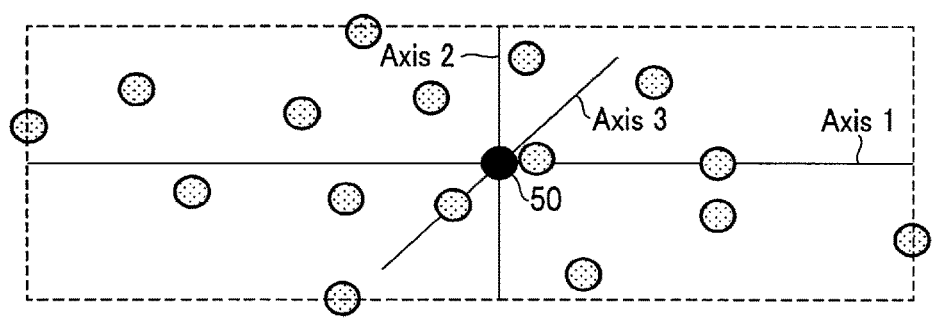
F I G. 14

WEATHER DATA PROCESSING APPARATUS AND METHOD USING WEATHER RADAR

CROSS-REFERENCE TO RELATED APPLICATIONS

This application is based upon and claims the benefit of priority from the Japanese Patent Application No. 2016-180873, filed Sep. 15, 2016, the entire contents of which are incorporated herein by reference.

FIELD

Embodiments described herein relate generally to a weather data processing apparatus and method using a weather radar.

BACKGROUND

In recent years, it is possible to three-dimensionally observe a condition of a cumulonimbus by a weather data processing apparatus which employs a phased array weather radar (PAWR). For example, by using a volume rendering technique, an observation result of a cumulonimbus can be three-dimensionally displayed on a screen of a computer.

Here, in the observation of the cumulonimbus, it is important to observe a central part of the cumulonimbus, which is called a core (mass of raindrops) that has a highest density. By observing the condition of generation of the core, the occurrence of torrential rain, for instance, can be predicted.

In a conventional weather data processing apparatus, the weather data collected by the PAWR is processed, and the observed cumulonimbus can be displayed as a three-dimensional (3D) image on the screen of the computer. Here, in the observation of the cumulonimbus, it is preferable that not only the 3D image of the entirety of the cumulonimbus, but also the observation result of the core of the cumulonimbus can be displayed. However, it is not easy to exactly detect the core of the cumulonimbus, without requiring complex weather data processing, and to display the image of the core of the cumulonimbus, together with the 3D image of the entirety of the cumulonimbus.

This being the case, there is a demand for realizing a weather data processing apparatus which can exactly detect the core of the cumulonimbus by relatively simple weather data processing, and can display the image of the core together with the 3D image of the entirety of the cumulonimbus.

BRIEF DESCRIPTION OF THE DRAWINGS

FIG. 1 is a block diagram for describing the configuration of a system according to an embodiment;

FIG. 11 is a view for describing an example of a result of the core detection process of detecting the core of the group according to the embodiment;

FIG. 12 is a view for describing an example of a result of the core detection process of detecting the core of the group according to the embodiment;

FIG. 13 is a view for describing an example of a result of the core detection process of detecting the core of the group according to the embodiment;

FIG. 14 is a view for describing an example of a result of the core detection process of detecting the core of the group according to the embodiment.

DETAILED DESCRIPTION

Figure 2:
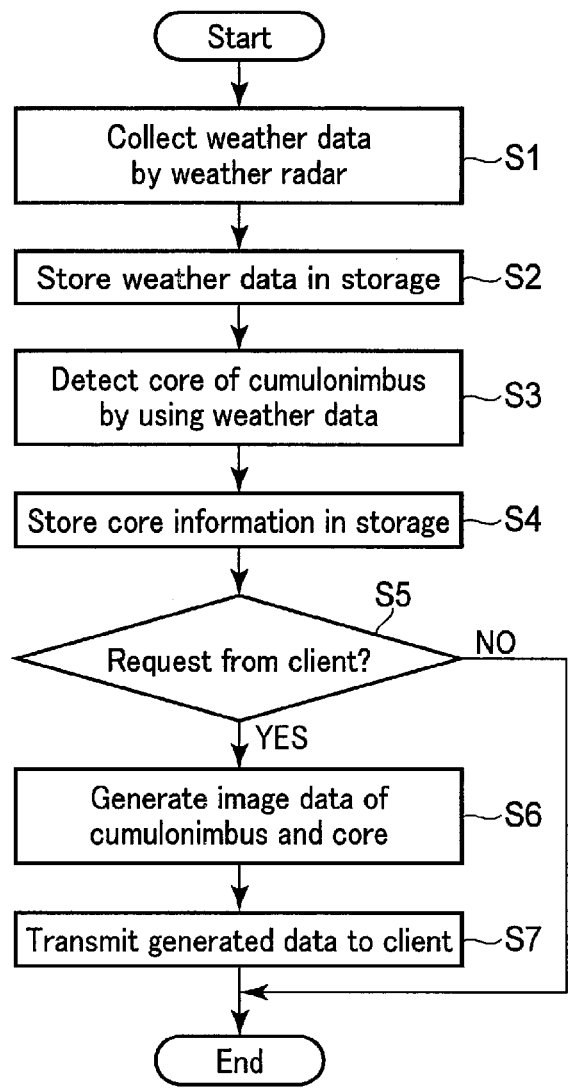
FIG. 2 is a flowchart for describing the operation of a weather data processing apparatus according to the embodiment.

In general, according to one embodiment, a weather data processing apparatus includes a storage configured to store weather data observed by a weather radar, and a processor. The processor is configured to acquire three-dimensional data of a cumulonimbus from the weather data; to detect a core of the cumulonimbus by using a principal component analysis process of the three-dimensional data; to calculate core detection data for displaying the core; and to execute a display process for effecting three-dimensional display of the cumulonimbus, and display of the core, based on the three-dimensional data of the cumulonimbus and the core detection data.

Various embodiments will be described hereinafter with reference to the accompanying drawings.

[Configuration of System]

FIG. 1 is a view illustrating the configuration of a system according to an embodiment. As illustrated in FIG. 1, this system 1 is configured to include a weather data processing apparatus, a phased array weather radar (hereinafter referred to as "PAW radar") 12, a network 14, and a client computer 15.

The PAW radar 12 is a weather radar which can three-dimensionally observe a weather phenomenon such as a cumulonimbus. The weather data processing apparatus includes a server 10, a weather data storage 11, and a core information storage 13. The server 10 is composed of a processor and software. The processor executes various processes by software, and, as will be described later, the processor executes a core detection process of detecting a core of a cumulonimbus, a three-dimensional (3D) display process of a cumulonimbus, and a display process of a core.

The weather data storage 11 stores weather data (three-dimensional (3D) data) of an observation target (a cumulonimbus in this embodiment) which is observed by the PAW radar 12. The weather data storage 11 stores map information including the position of the observation target, as well as the weather data that is the 3D data. The core information storage 13 stores core information including core detection data which is calculated by the core detection process of the cumulonimbus that is executed by the server 10.

The server 10 is connected to the client computer 15 via the network 14 such as the Internet. The client computer 15 can request, via the network 14, the server 10 to provide weather information of a cumulonimbus, etc. Responding to the request from the client computer 15, the server 10 transmits display information for displaying a 3D image of the cumulonimbus and an image of the core on a screen 16 of the client computer 15. The request from the client computer 15 includes information relating to a position and time of the cumulonimbus which occurred as a weather phenomenon.

[Operation of System]

FIG. 2 is a flowchart describing the operation of the system of the embodiment. As illustrated in FIG. 2, the system 1 acquires, from the PAW radar 12, weather data (3D data) indicative of an observation result of the cumulonimbus that occurred (step S1). The weather data acquired from the PAW radar 12 is stored in the weather data storage 11 (step S2).

The server 10 acquires 3D data, which is the weather data of the cumulonimbus, from the weather data storage 11, and executes a core detection process of detecting the core of the cumulonimbus, by using the 3D data (step S3). The server 10 stores core information, which includes core detection data calculated by the core detection process, in the core information storage 13 (step S4).

Next, the server 10 determines whether the provision of weather information (the condition of the cumulonimbus in this example) was requested from the client computer 15 via the network 14 (step S5). If there is no request from the client computer 15, the server 10 stores the core information in the core information storage 13, and terminates the process (NO in step S5).

On the other hand, if there is the request from the client computer 15 (YES in step S5), the server 10 generates image data of the cumulonimbus and core (step S6). Here, the server 10 acquires the 3D data of the cumulonimbus from the weather data storage 11, and acquires the core detection data from the core information storage 13. The server 10 generates display information for displaying the 3D image of the cumulonimbus and the image of the core.

The server 10 transmits the generated display information to the client computer 15 via the network 14 (step S7). Based on the display information, the client computer 15 executes an application, and can thereby display the 3D image of the cumulonimbus and the image of the core (3D image and two-dimensional (2D) image) on the screen 16 (see FIGS. 15A and 15B).

[Core Detection Process]

Figure 3:
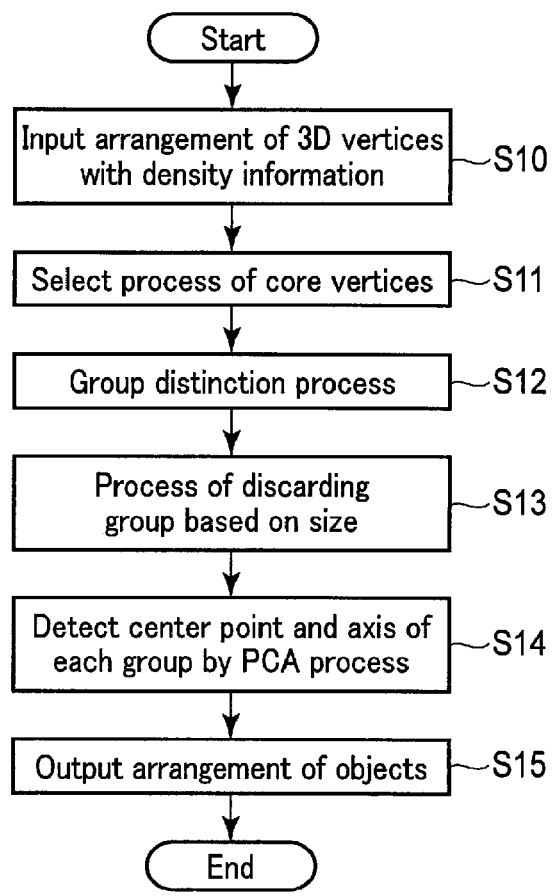
FIG. 3 is a flowchart for describing a core detection process according to the embodiment.

In the above operation of the system, the procedure of the core detection process (step S3), which the server 10 executes, will be described with reference to a flowchart of FIG. 3. Here, in the present embodiment, the server 10 calculates the core detection data in which the core is described as, for example, an ellipsoidal image, by using a well-known principal component analysis (PCA) process as the core detection process. In this embodiment, the server 10 calculates, by the PCA process, a principal component (axis of principal component), based on the correlation between [x, y, z] variables at many three-dimensional (3D) vertices.

The server 10 acquires 3D data of the cumulonimbus, which is observed by the PAW radar 12, from the weather data storage 11. Specifically, the server 10 inputs data ([x, y, z, intensity], . . . ) indicative of an arrangement of 3D vertices with density information, which indicates the density of raindrops of the cumulonimbus (step S10). Here, the [x, y, z] is a parameter indicative of the 3D vertex, and [intensity] is a parameter indicative of the density. A part with the highest density indicates the core of the cumulonimbus.

The server 10 executes a selection process of selecting, from the input data, core vertices from the arrangement of 3D vertices, based on each of reference parameters of the lowest density of the core part and the lowest altitude of the vertex (step S11). The lowest density of the core part is a density which is used as a reference for detecting a detection target as the core. In addition, the lowest altitude of the vertex is an altitude which is used as a reference for eliminating the influence of a mountain or the like from the observation result of the cumulonimbus which is observed by the PAW radar 12.

Next, the server 10 executes a group distinction process of grouping core vertices, which were selected by the selection process of step S11, by using the radius of a sphere as a parameter (step S12). The server 10 discards a group, which is excessively smaller than a reference among the respective groups, by using the minimum size (core vertex number) of the group as a parameter (step S13). Here, on the assumption that the center of the core has a highest density (core vertex number) of vertices, the radius of the sphere becomes longer in an order beginning with the vertex with a highest density.

The server 10 executes the PCA process, and calculates (detects) the center point and axis of each of groups (e.g. two groups) created by the group distinction process (step S14). Here, the axis is a principal component calculated by the PCA, and is an axial line of an inclination, which passes through the center point. Specifically, the server 10 outputs core detection data ([{center: [x, y, z], axis: [[x1, y1, z1], [x2, y2, z2], [x3, y3, z3],]}, . . . ]) which indicates an arrangement of an object (an image of a core) describing, for example, an ellipsoid (step S15).

Figure 4:
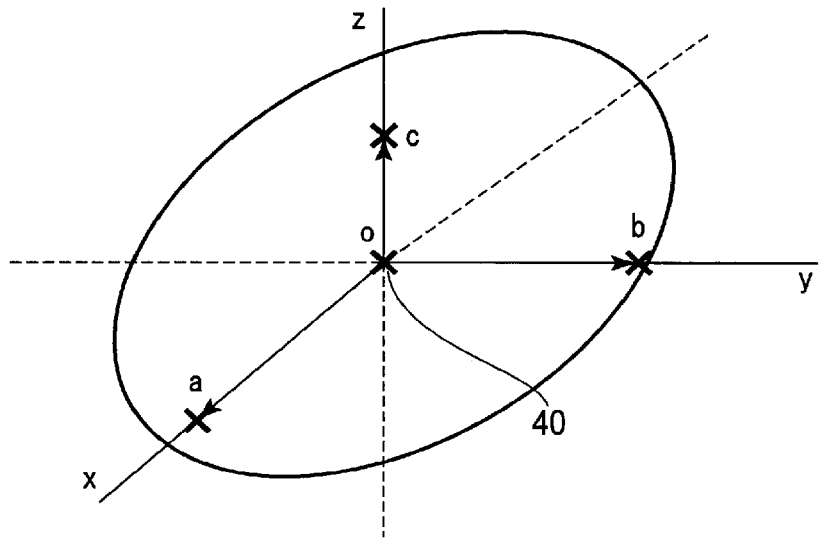
FIG. 4 is a view illustrating an example of the image of a core by the core detection process according to the embodiment.

FIG. 4 is a view illustrating an example of the present object (the image of the core). Here, "center: [x, y, z]" corresponds to a center point 40 in FIG. 4. The server 10 stores in the core information storage 13 the core information including the core detection data calculated by the PCA process. The core information includes the 3D data of the cumulonimbus stored in the weather data storage 11, and information which is linked to map information.

Next, referring to a flowchart of FIG. 5, the procedure of the group distinction process (step S12), which the server 10 executes, will be described.

Figure 5:
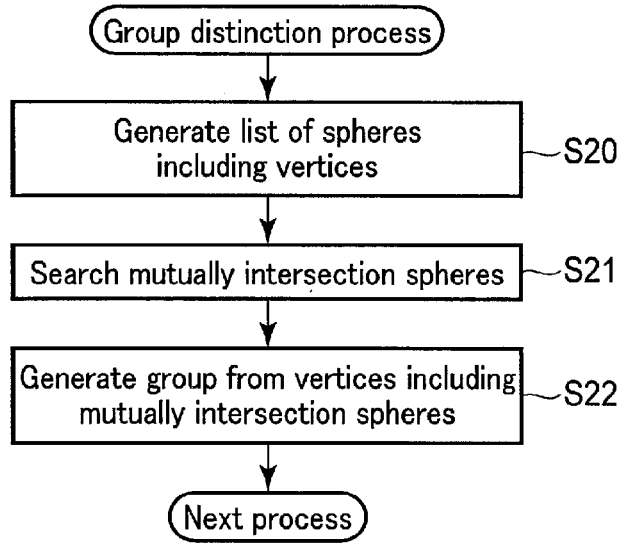
FIG. 5 is a flowchart for describing a group distinction process according to the embodiment.

As illustrated in FIG. 5, on the assumption that the center of the core has a highest density of vertices (core vertex number), the server 10 generates a list of spheres including core vertices in an order beginning with the lowest density (step S20). The server 10 searches mutually intersecting spheres from the generated list (step S21). Moreover, the server 10 generates a group (i.e. a core) of vertices including the mutually intersecting spheres (step S22).

Figure 6A:
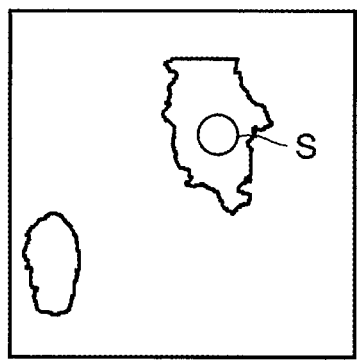
FIGS. 6A, 6B, 6C and 6D are views illustrating examples of the display image of cores by the group distinction process according to the embodiment.
Figure 6B:
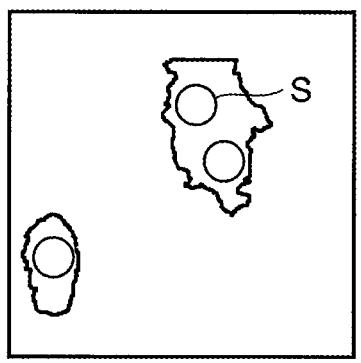
Figure 6C:
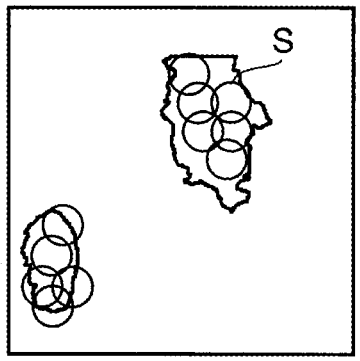
Figure 6D:
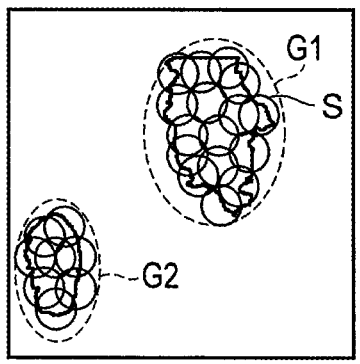

FIGS. 6A, 6B, 6C and 6D are views illustrating examples of images corresponding to a series of processes of steps S20, S21 and S22. Here, FIG. 6C is a view illustrating an example of the image of mutually intersecting spheres S. FIG. 6D is a view illustrating an example of generation of a group G1 and a group G2 including mutually intersecting spheres S.

Figure 7A:
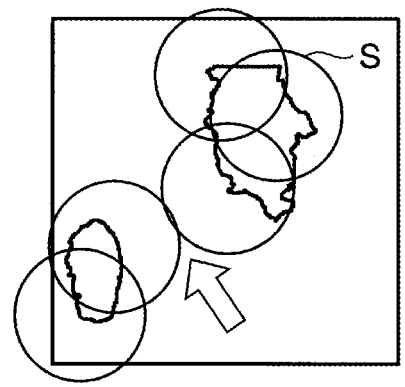
FIGS. 7A and 7B are views illustrating examples of the display image of cores by the group distinction process according to the embodiment.
Figure 7B:
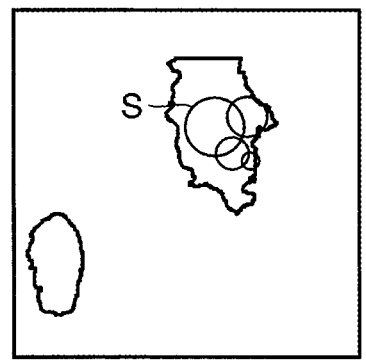

Here, as the radius of the sphere S becomes greater, the group distinction process can be executed at a higher speed. However, as illustrated in FIG. 7A, if the radius of the sphere S is too large, it is possible that two discrete cores are recognized as one core. Thus, on the assumption that the density of the vertex is highest at the center of the core, the server 10 calculates the radius of the sphere S by the calculation formula "radius=density×α". Here, "α" is a parameter of the group distinction process. Accordingly, as illustrated in FIG. 7B, the server 10 can recognize a group including intersecting spheres 5, by distinguishing this group from between the two discrete groups.

Next, referring to flowcharts of FIG. 8 and FIG. 9, a concrete description will be given of the generation process of the list of spheres (step S20) and the process (step S21) of searching intersecting spheres, these processes being included in the group distinction process.

Figure 8:
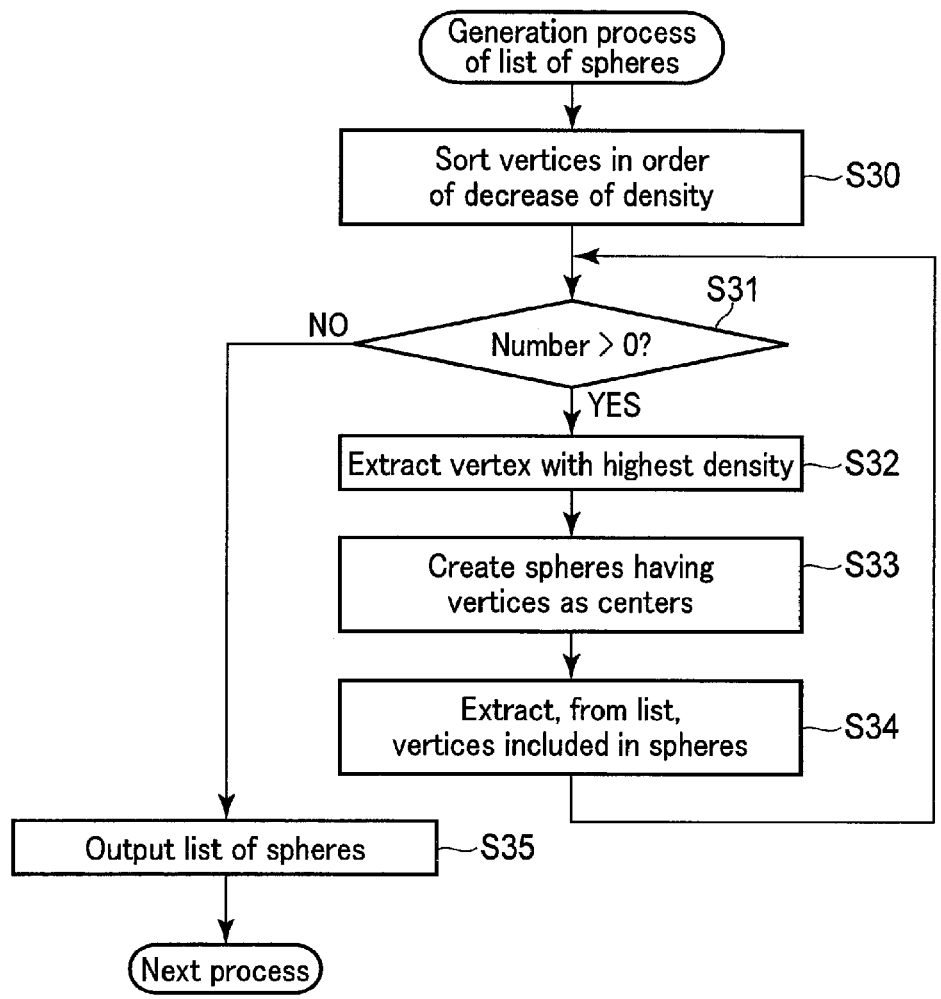
FIG. 8 is a flowchart for describing a generation process of a list of spheres according to the embodiment.

As illustrated in FIG. 8, the server 10 first sorts vertices in the order beginning with the lowest density (step S30). The server 10 determines whether the number of vertices of a predetermined core is 0 or not (step S31). If the determination result is greater than 0 (Yes in step S31), the server 10 executes a process of extracting a vertex with a highest density (step S32). The server 10 sets in the list a sphere having this vertex as its center (step S33).

Furthermore, the server 10 executes a process of extracting, from the list, the vertex included in the sphere (step S34). The server 10 repeats the process of step S32 to step S34, until the number of vertices of the predetermined core becomes 0. If the number of vertices of the predetermined core becomes 0 (NO in step S31), the server 10 outputs the list of generated spheres (step S35).

Figure 9:
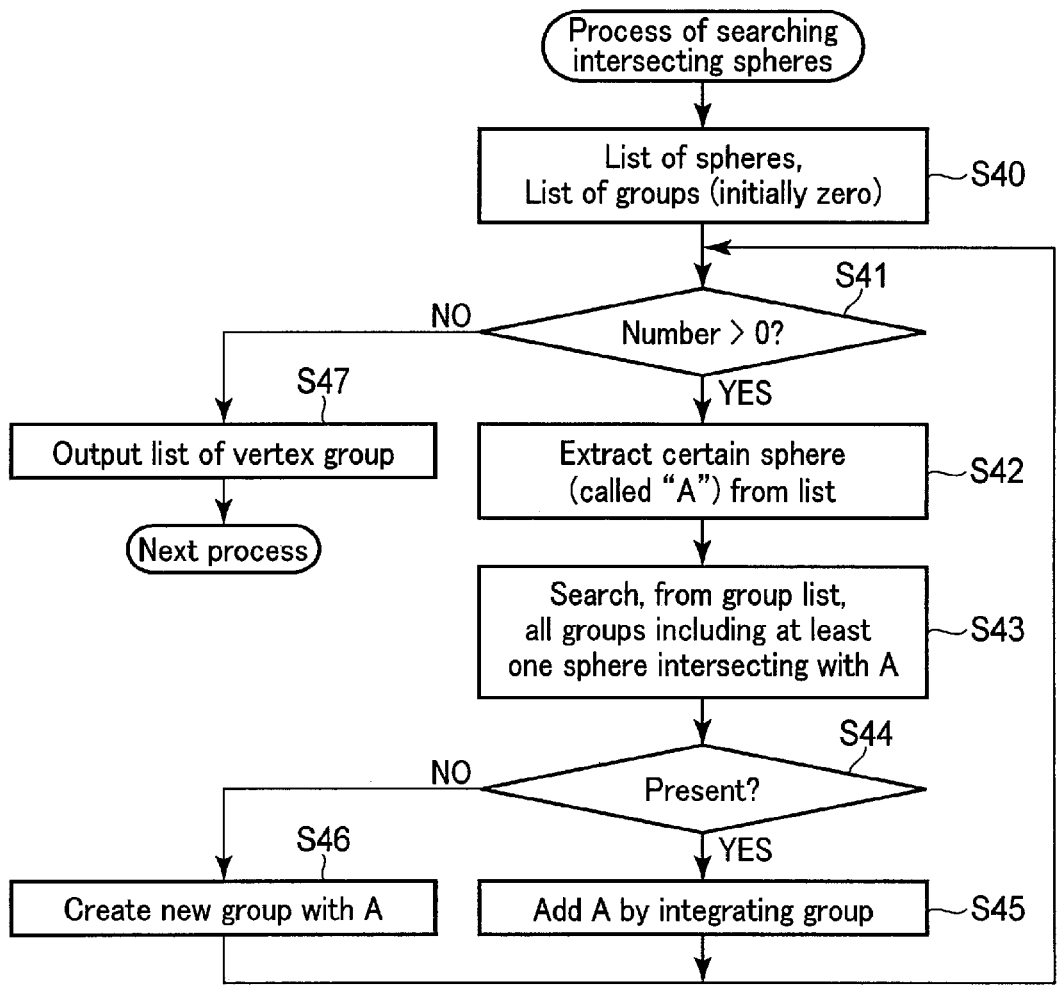
FIG. 9 is a flowchart for describing a process of searching intersecting spheres according to the embodiment.
Figure 10:
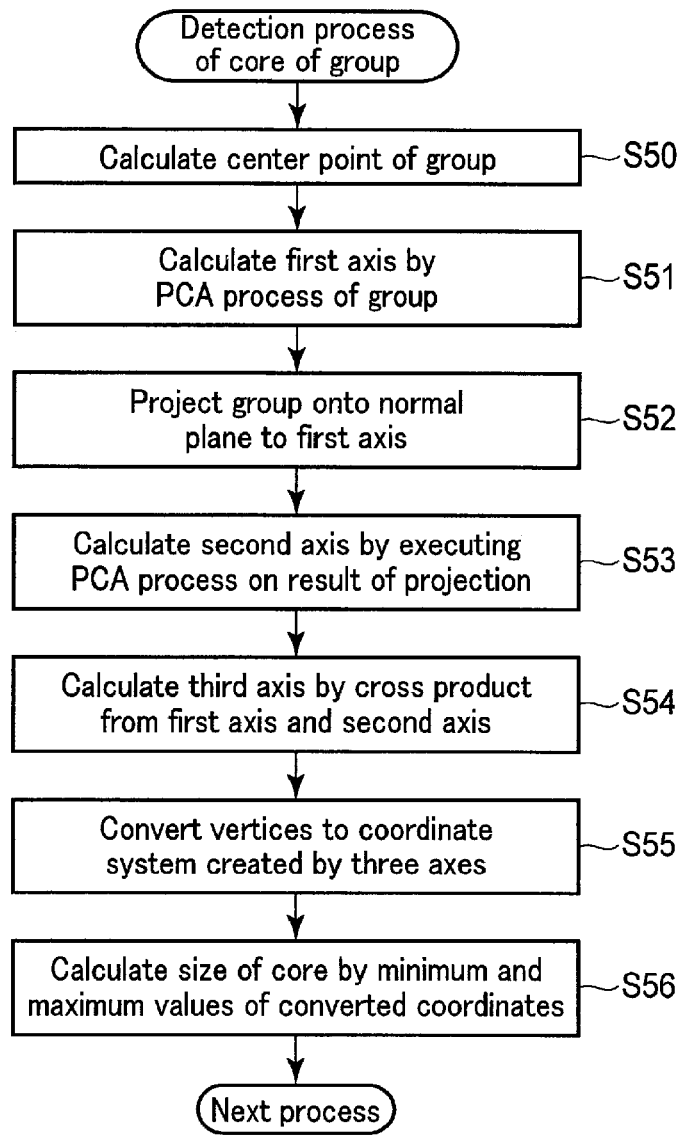
FIG. 10 is a flowchart for describing a core detection process of detecting a core of a group according to the embodiment.

Moreover, as illustrated in FIG. 9, the server 10 prepares a list of spheres, which was generated in the initial stage, and a list of groups, which is empty (step S40). The server 10 determines whether the number of vertices of a predetermined core is 0 or not (step S41). If the determination result is greater than 0 (Yes in step S41), the server 10 executes a process of extracting a sphere (A) from the list of spheres (step S42). Next, the server 10 searches all groups including spheres which intersect with the sphere (A) (step S43).

The server 10 determines whether there is a group or not (step S44). In the initial stage, since there is no group (NO in step S44), the server 10 newly creates a group including the sphere (A) (step S46).

On the other hand, if there is a group including a sphere intersecting with the sphere (A) (YES in step S44), the server 10 executes a process of adding the sphere (A) by integrating this group (step S45). If the number of vertices of the predetermined core becomes 0 (NO in step S41), the server 10 outputs the list of groups of vertices including mutually intersecting spheres (step S47).

Next, referring to a flowchart of FIG. 10, and FIGS. 11 to 14, a concrete description will be given of the core detection process (step S14) of detecting cores of each of groups (e.g. two groups).

To start with, the server 10 executes the PCA process of each group, and calculates a center point 50 (center: [x, y, z]) of each group (step S50). Further, the server 10 calculates a first axis (first principal component) which passes through the calculated center point 50 (step S51). As illustrated in FIG. 11, this first axis is a straight line which passes through the center point 50 of each group.

Next, the server 10 executes a process of projecting the vertices of the group onto a normal plane to the calculated first axis (step S52). FIG. 12 is a view illustrating an example of the projection process. Further, the server 10 executes a PCA process on the result of the projection process, thereby calculating a second axis (second principal component) which is perpendicular to the calculated first axis (step S53). The server 10 calculates a third axis (axis 3) by a cross product process from the calculated first axis (axis 1) and second axis (axis 2) (step S54). FIG. 13 is a view illustrating an example of the calculation result of the third axis (axis 3).

Next, the server 10 converts the vertices to a coordinate system which is composed of the three axes, namely the first axis, second axis and third axis (step S55). The server 10 calculates a size of a core, based on the minimum value and maximum value of the converted coordinate system (step S56). Specifically, as illustrated in FIG. 14, it is possible to calculate an image (see FIG. 4) of the core which is formed of the shape of an ellipsoid, which agrees with a frame indicated by a broken line.

As described above, according to the present embodiment, the server 10 of the weather data processing apparatus acquires the 3D data of a cumulonimbus, which is observed by the PAW radar 12, from the weather data storage 11, and executes the core detection process which detects the core of the cumulonimbus by using the 3D data. Here, by using the well-known PCA process, the server 10 executes the core detection process which calculates the principal component (axis), based on the correlation between [x, y, z] variables at the 3D vertices of the core, and calculates the core detection data in which the core is described as, for example, an ellipsoidal image.

Furthermore, the server 10 stores in the core information storage 13 the core information including the core detection data calculated by the core detection process. This core information includes the 3D data of the cumulonimbus stored in the weather data storage 11, and information which is linked to map information. Therefore, according to the present embodiment, a plurality of cores of the cumulonimbus can exactly be detected by the relatively simple data process which utilizes the well-known PCA process.

Moreover, in response to a request from the client computer 15 (including information relating to the position and time of the cumulonimbus that occurred), the server 10 acquires the 3D data of the cumulonimbus, and the core detection data from the core information storage 13, and generates the display information for displaying the 3D image of the cumulonimbus and the image of the core. The server 10 transmits the generated display information to the client computer 15 via the network 14.

Figure 15A:
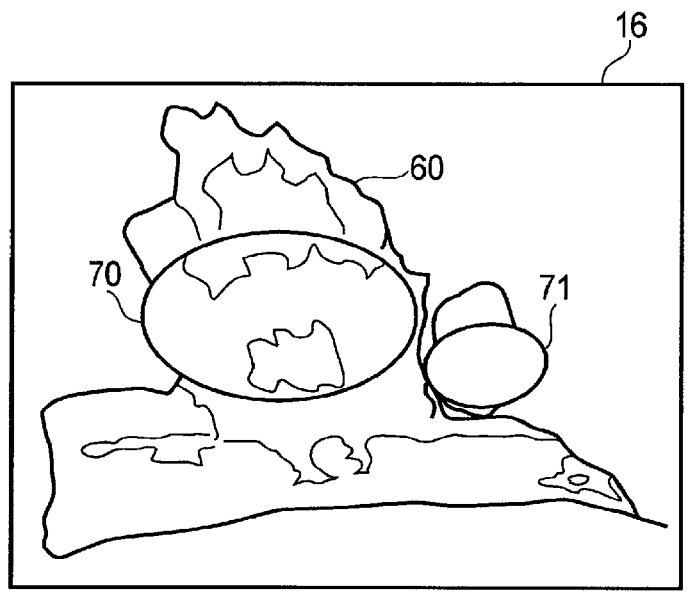
FIGS. 15A and 15B are views illustrating examples of the display mode of a cumulonimbus and cores according to the embodiment.

The client computer 15 executes the application, based on the display information provided from the server 10, thereby being able to display the 3D image of the cumulonimbus and the image of the core on the screen 16. Specifically, in a display mode as illustrated in FIG. 15A, on the screen 16, a 3D image 60 of the cumulonimbus is displayed on the map, and, for example, ellipsoidal images 70 and 71 (see FIG. 4) of two cores, which are detected, are additionally displayed. Accordingly, on the screen 16 of the client computer 15, the shape of the entirety of the cumulonimbus can be visualized by the 3D display 60, and the positions and sizes of the plural cores can be understood at the same time.

Figure 15B:
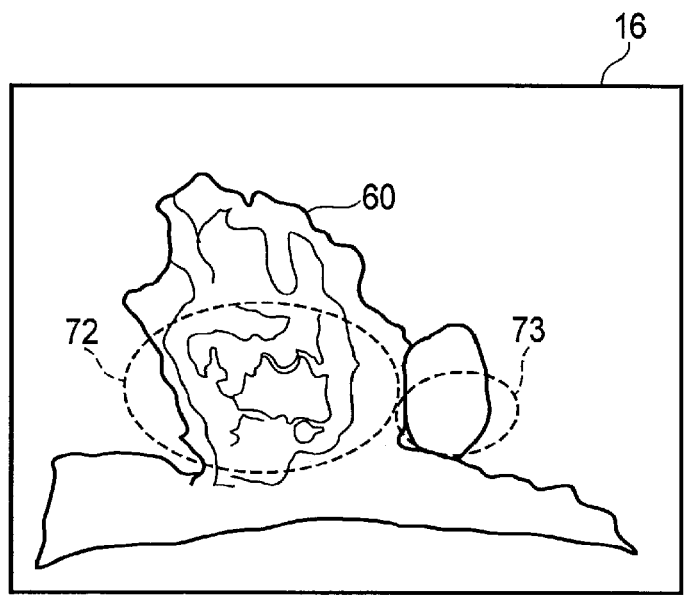

In addition, a display mode as illustrated in FIG. 15B may be adopted. In this display mode, on the screen 16, the 3D image 60 of the cumulonimbus is displayed on the map, and, for example, two-dimensional images 72 and 73 of ellipsoids of two cores, which are detected, are displayed. In the case of this display mode, it is possible to effectively display the cores in such a degree that the positions and sizes of the cores can be recognized, without hindering visualization of the entirety of the cumulonimbus by the 3D display. Besides, by making use of the core detection data, advection display (animation display) of the plural cores can be performed at the same time as the 3D display of the entirety of the cumulonimbus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A weather data processing apparatus comprising:
a storage configured to store three-dimensional data of a cumulonimbus, the three-dimensional data indicative of an arrangement of three-dimensional vertices with density information indicative of a density of raindrops of the cumulonimbus, as weather data, observed by a weather radar; and
a processor,
the processor being configured to:
acquire the three-dimensional data from the storage;
execute a selection process of selecting core vertices from the arrangement of the three-dimensional vertices, based on each of reference parameters of the lowest density of a core part and the lowest altitude of a vertex of the cumulonimbus in the arrangement of three-dimensional vertices;
execute a group distinction process of generating a group of the core vertices selected by the selection process, by grouping vertices with mutually intersecting spheres by using radius of the spheres as a parameter;
calculate a center point and an axis of each of groups created by the group distinction process, by executing the principal component analysis process; and
execute a display process for effecting image display of an ellipsoidal image taking the center point as a center and including the core vertices converted to a coordinate system including the axis, as an image of a core of the cumulonimbus.

2. A method of processing weather data in a weather data processing apparatus configured to process weather data observed by a weather radar, the method comprising:
storing three-dimensional data of a cumulonimbus, the three-dimensional data indicative of an arrangement of three-dimensional vertices with density information indicative of a density of raindrops of the cumulonimbus, as the weather data, in a storage;
acquiring the three-dimensional data from the storage;
executing a selection process of selecting core vertices from the arrangement of the three-dimensional vertices, based on each of reference parameters of the lowest density of a core part and the lowest altitude of a vertex of the cumulonimbus in the arrangement of three-dimensional vertices;
executing a group distinction process of generating a group of the core vertices selected by the selection process, by grouping vertices with mutually intersecting spheres by using radius of the spheres as a parameter;
calculating a center point and an axis of each of groups created by the group distinction process, by executing the principal component analysis process; and
executing a display process for effecting image display of an ellipsoidal image taking the center point as a center and including the core vertices converted to a coordinate system including the axis, as an image of a core of the cumulonimbus.

3. A non-transitory computer-readable storage medium storing a computer program performed by a computer, the computer program comprising:
a code of storing three-dimensional data of a cumulonimbus, the three-dimensional data indicative of an arrangement of three-dimensional vertices with density information indicative of a density of raindrops of the cumulonimbus, as the weather data observed by a weather radar, in a storage; and
a code of acquiring the three-dimensional data from the storage;
a cord of executing a selection process of selecting core vertices from the arrangement of the three-dimensional vertices, based on each of reference parameters of the lowest density of a core part and the lowest altitude of a vertex of the cumulonimbus in the arrangement of three-dimensional vertices;
a cord of executing a group distinction process of generating a group of the core vertices selected by the selection process, by grouping vertices with mutually intersecting spheres by using radius of the spheres as a parameter;
a cord of calculating a center point and an axis of each of groups created by the group distinction process, by executing the principal component analysis process; and
a code of executing a display process for effecting image display of an ellipsoidal image taking the center point as a center and including the core vertices converted to a coordinate system including the axis, as an image of a core of the cumulonimbus.

* * * * *